US010581586B2

(12) United States Patent
Liao et al.

(10) Patent No.: US 10,581,586 B2
(45) Date of Patent: Mar. 3, 2020

(54) SENSOR DEVICES, METHODS, MULTI-SENSOR SYSTEMS/APPARATUSES CAPABLE OF CALIBRATING CLOCK SIGNAL(S) AND OUTPUTTING INTEGRATED DATA PACKETS ACCORDING TO COMMUNICATION BETWEEN HOST AND AUXILIARY DEVICE

(71) Applicant: PixArt Imaging Inc., Hsin-Chu (TW)

(72) Inventors: Chien-Lung Liao, Hsin-Chu (TW);
Hsin-Chi Cheng, Hsin-Chu (TW);
Shan-Jung Chang, Hsin-Chu (TW);
Yi-Lun Huang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 11 days.

(21) Appl. No.: 15/694,874

(22) Filed: Sep. 4, 2017

(65) Prior Publication Data

US 2019/0074958 A1  Mar. 7, 2019

(51) Int. Cl.
*H04L 7/033*    (2006.01)
*G06F 1/12*     (2006.01)
*G06F 13/00*    (2006.01)
*H04L 7/00*     (2006.01)
*H04J 3/06*     (2006.01)
*H04L 12/40*    (2006.01)

(52) U.S. Cl.
CPC .............. *H04L 7/033* (2013.01); *G06F 1/12* (2013.01); *G06F 13/00* (2013.01); *H04L 7/0012* (2013.01); *H04J 3/0697* (2013.01); *H04L 12/40* (2013.01)

(58) Field of Classification Search
CPC ........ H04L 7/033; H04L 7/0012; H04L 12/40
USPC ........................... 375/359; 600/300; 374/143
See application file for complete search history.

(56) References Cited

U.S. PATENT DOCUMENTS

| 4,195,349 | A | * | 3/1980 | Balkanli | ................. E21B 47/06 374/143 |
| 2003/0161646 | A1 | * | 8/2003 | Nagata | ................. G03G 21/206 399/38 |
| 2010/0268056 | A1 | * | 10/2010 | Picard | ................. A61B 5/0531 600/300 |
| 2017/0153121 | A1 | * | 6/2017 | Hsu | ........................ G01C 25/00 |
| 2018/0081389 | A1 | * | 3/2018 | Wu | ............................ G06F 1/08 |

* cited by examiner

*Primary Examiner* — Chieh M Fan
*Assistant Examiner* — Fitwi Y Hailegiorgis
(74) *Attorney, Agent, or Firm* — Winston Hsu (57) ABSTRACT

A sensor device capable of adjusting at least one clock signal of the sensor device according to a communication between a host and an auxiliary device through a specific bus includes a first oscillator circuit and a processing circuit. The first oscillator circuit is configured for generating a first clock signal. The processing circuit is configured for calibrating a clock frequency of the first clock signal according to the communication between the host and the auxiliary device.

16 Claims, 4 Drawing Sheets

SENSOR DEVICES, METHODS, MULTI-SENSOR SYSTEMS/APPARATUSES CAPABLE OF CALIBRATING CLOCK SIGNAL(S) AND OUTPUTTING INTEGRATED DATA PACKETS ACCORDING TO COMMUNICATION BETWEEN HOST AND AUXILIARY DEVICE

BACKGROUND OF THE INVENTION

1. Field of the Invention

The invention relates to a multi-sensor system, and more particularly to a multi-sensor system/apparatus capable of calibrating clock signal(s) and outputting integrated data packets according to a communication between a host and an auxiliary device.

2. Description of the Prior Art

Generally speaking, in a conventional multi-sensor system, a real-time clock circuit externally connected to multiple sensor devices may be employed for providing an accurate clock reference source for the sensor devices to synchronize the sensor devices. This inevitably results in that each of the sensor devices needs to implement an additional signal port/pin to receive such clock reference source. In another conventional multi-sensor system, the synchronization of multiple sensor devices is made by the host. The host needs to execute/run more complicated software algorithms to synchronize data of the multiple sensor devices. However, the above conventional schemes/solutions cannot be accepted by users.

SUMMARY OF THE INVENTION

Therefore one of the objectives of the invention is to provide sensor devices, methods, multi-sensor systems/apparatuses capable of calibrating clock signal(s) and outputting integrated data packets according to a communication between a host and an auxiliary device, to solve the above-mentioned problems.

According to embodiments of the invention, a sensor device capable of adjusting at least one clock signal of the sensor device according to a communication between a host and an auxiliary device through a specific bus is disclosed. The sensor device comprises a first oscillator circuit and a processing circuit. The first oscillator circuit is configured for generating a first clock signal. The processing circuit is configured for calibrating a clock frequency of the first clock signal according to the communication between the host and the auxiliary device.

According to the embodiments, a sensor device capable of outputting data of the sensor device and data of an auxiliary device to a host when the sensor device and the auxiliary device are electrically connected to the host through a specific bus is disclosed. The data of the sensor device is aligned with the data of the auxiliary device. The sensor device comprises a receiving port and a processing circuit. The receiving port is configured for receiving the data of the auxiliary device according to a data request signal sent from the host and transmitted on the specific bus, the data request signal being used for requesting the data of the auxiliary device. The processing circuit is coupled to the receiving port and configured for outputting the data of the sensor device and the data of the auxiliary device according to the data request signal.

According to the embodiments, a method applied to a sensor device and capable of adjusting at least one clock signal of the sensor device according to a communication between a host and an auxiliary device through a specific bus is disclosed. The method comprises: using a first oscillator circuit to generate a first clock signal; and calibrating a clock frequency of the first clock signal according to the communication between the host and the auxiliary device.

According to the embodiments, a method applied into a sensor device and capable of outputting data of the sensor device and data of an auxiliary device to a host when the sensor device and the auxiliary device are electrically connected to the host through a specific bus is disclosed. The data of the sensor device is aligned with the data of the auxiliary device. The method comprises: using a receiving port of the sensor device to receive the data of the auxiliary device according to a data request signal sent from the host and transmitted on the specific bus, the data request signal being used for requesting the data of the auxiliary device; and outputting the data of the sensor device and the data of the auxiliary device from the sensor device according to the data request signal.

According to the embodiments, a multi sensor system/apparatus is disclosed. The system/apparatus comprises a processor, at least a first sensor and a second sensor, a shared channel between the processor, the first sensor and the second sensor. The first sensor is configured to receive an auxiliary packet including data from the second sensor through the shared bus and generate an integrated packet including data from the first sensor and the data from the second sensor. The processor is configured to retrieve the integrated packer to obtain the data from the first sensor and the data from the second sensor.

According to the embodiments, a sensor device receiving data from a shared channel is disclosed. The shared channel connects the sensor device, a host device and an auxiliary device. The sensor device comprises a receiving port and a data generating module. The receiving port is configured to receive a plurality of auxiliary packets in a given period of time, and each auxiliary packet includes data from the auxiliary device. The data generating module is configured to generate at least one sensing packet based on a number of the plurality of auxiliary packets received in the given period of time.

These and other objectives of the present invention will no doubt become obvious to those of ordinary skill in the art after reading the following detailed description of the preferred embodiment that is illustrated in the various figures and drawings.

DETAILED DESCRIPTION

The embodiments of the invention are to listen to (snoop) and/or monitor communication(s) periodically transmitted through a shared channel such as a shared bus interface so as to adjust/calibrate clock signal(s) of a specific sensor device which is connected to the shared channel. The periodically transmitted communication(s) can be periodically issued by a host, an auxiliary device, or a second sensor device; the periodically transmitted communication(s) can be used as accurate clock reference signal(s) for the specific sensor device so that the specific sensor device is able to adjust or finely tune its clock signal(s) and/or adjust signal(s) sensed by the specific sensor device itself. For example, the specific sensor device can adjust the timing of its sensed signal(s) based on the accurate clock reference signal(s).

Particularly, the specific sensor device can precisely calibrate at least two clock signals having different clock frequencies based on the same periodically transmitted/issued communication(s) even though the at least two clock signals having different clock frequencies may correspond to different frequency offsets or variations.

In addition, the embodiments of the invention are to listen to, monitor, and collect/access the communication(s) transmitted through the shared channel, e.g. an auxiliary device's data which is transmitted through the shared channel, so as to synchronize data of the specific sensor device with the auxiliary device's data, e.g., to align data generated by a photoplethysmogram (PPG) sensor device in a given period of time with data of accelerometer/accelerator sensor device in such given period of time. The PPG sensor device can generate and provide integrated data/packets having both data of PPG sensor device and data of accelerometer/accelerator sensor device for the host or another external circuit to calculate a user's heart rate and/or other biomedical features. It is more convenient for the host such as a microcontroller or sensor hub, another external circuit, or software algorithm(s) to calculate and derive biomedical features since data of PPG sensor device and data of accelerometer/accelerator sensor device has been aligned and generated/provided by the PPG sensor device. Any modifications of the above embodiments should fall within the scope of the invention. The embodiments are detailed in the following.

Figure 1:
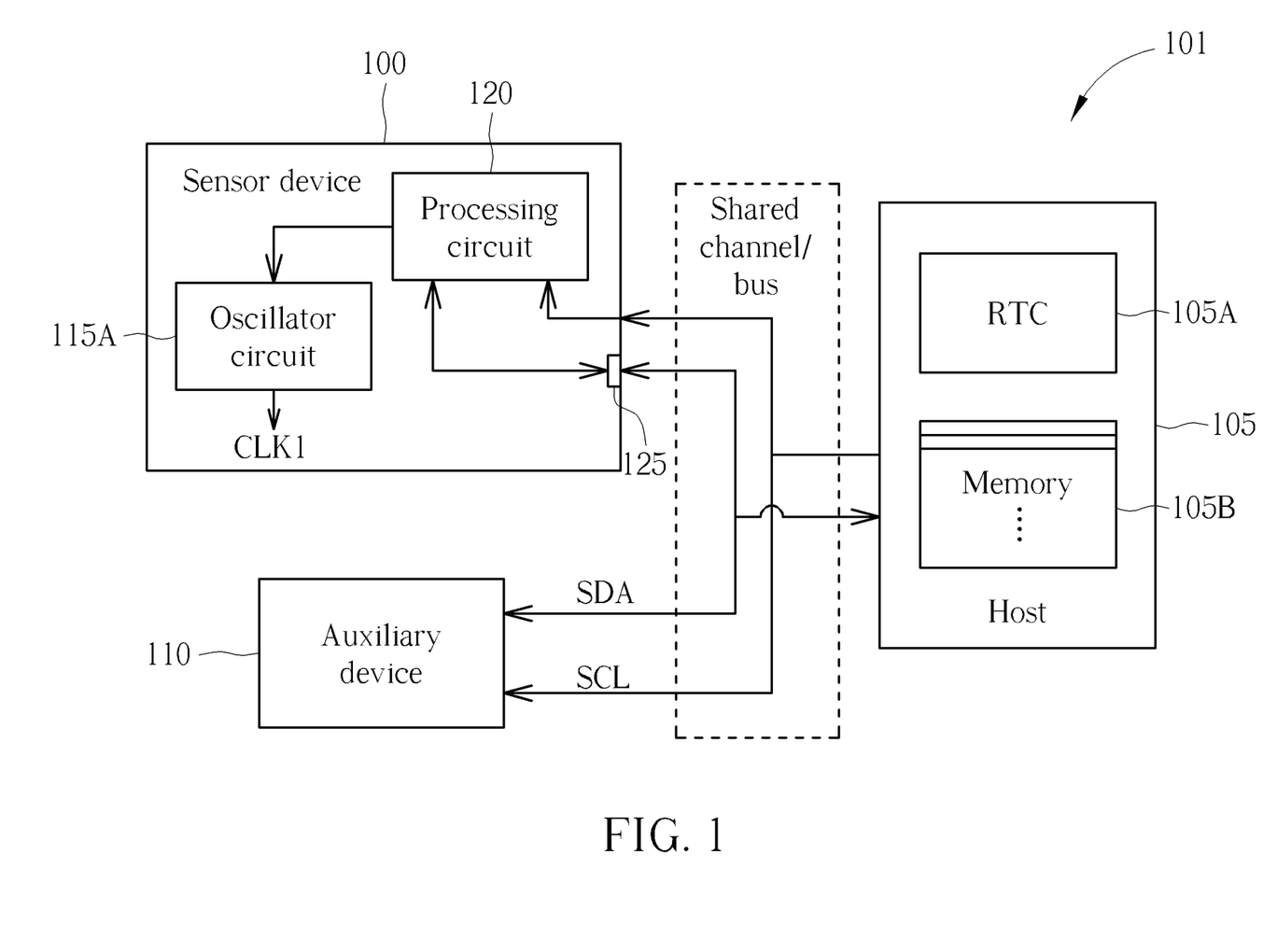
FIG. 1 is a diagram of a multi-sensor system/apparatus according to a first embodiment of the invention.

FIG. 1 is a diagram of a multi-sensor system/apparatus 101 according to a first embodiment of the invention. The multi-sensor system/apparatus 101 comprises a processor or host 105, at least a first sensor device 100 and an auxiliary device 110 such as a second sensor device, a shared channel connected between host 105, sensor device 100, and auxiliary device 110. The sensor device 100 for example is a PPG sensor device (but not limited) and is capable of adjusting at least one clock signal of sensor device 100 according to a communication between host 105 and auxiliary device 110 and/or a communication between host 105 and sensor device 100 through a specific shared channel/bus such as I2C (inter-integrated circuit) bus or SPI (Serial Peripheral Interface) bus; this is not intended to be a limitation.

The host 105 for example is a microcontroller (but not limited) comprising a real time clock (RTC) circuit 105A and memory circuit (s) 105B. The specific bus indicates the shared channel. The communication between host 105 and auxiliary device 110 through the specific bus may comprise a data request signal sent from the host 105 to the auxiliary device 110, information/data/packets sent back by auxiliary device 110, and/or any signal transmitted between host 105 and auxiliary device 110 through the specific bus. For instance, the communication may indicate a data request signal periodically sent from the host 105 to the auxiliary device 110 to request data of the auxiliary device 110. Alternatively, the communication may indicate information/data/packets periodically sent back by auxiliary device 110 to the host 105 in a given period of time.

Additionally, the communication between host 105 and sensor device 100 through the specific bus may comprise a data request signal sent from the host 105 to the sensor device 100. For instance, the communication may indicate a data request signal periodically sent from the host 105 to the sensor device 100 to request data of sensor device 100.

In an example of sensor device 100 implemented using the PPG sensor device, the auxiliary device 110 for example may be an accelerometer/accelerator sensor device (but not limited). The PPG sensor device 100 can be arranged to adjust or calibrate its clock signal(s) (e.g. clock frequency CLK1 of an oscillator circuit 115A) based on the communication between host 105 and accelerometer/accelerator sensor device 110 such as ID and data information periodically transmitted from the accelerometer/accelerator sensor device 110 to host 105. For example, for calibrating its clock signal CLK1, the PPG sensor device 100 is arranged to listen to or monitor communication transmitted on the specific bus. If detecting that ID and data information periodically transmitted from the accelerometer/accelerator sensor device 110 in a given period of time, the sensor device 100 is arranged to calibrate or tune its clock signal CLK1 based on the detection result, to adjust rising/falling edges of clock signal CLK1. The ID and data information periodically transmitted is used as an accurate reference source for clock calibration/adjustment.

Alternatively, in other examples, for calibrating its clock signal CLK1, the PPG sensor device 100 can be arranged to listen to or monitor a data request signal periodically sent from host 105 to accelerometer/accelerator sensor device 110. If detecting that such periodically transmitted data request signal in a given period of time, the sensor device 100 is arranged to calibrate or tune its clock signal CLK1 based on the detection result, to adjust rising/falling edges of clock signal CLK1. The periodically transmitted data request signal is used as an accurate reference source for clock calibration/adjustment.

In practice, the sensor device 100 comprises the oscillator circuit 115A and a processing circuit 120. The oscillator circuit 115A is configured for generating the first clock signal CLK1. The clock signal CLK1 for example has a clock frequency equal to 32 KHz (but not limited). The processing circuit 120 is configured for controlling the oscillator circuit 115A so as to calibrate a clock frequency of the first clock signal CLK1 according to the communication between the host 105 and the auxiliary device 110. In this embodiment, the shared channel/bus for examples is the I2C bus comprising a serial data line SDA and a serial clock line SCL. Each of the PPG sensor device 100, accelerometer/accelerator sensor device 110, and the host 105 is connected to the serial data line SDA and serial clock line SCL of I2C bus. The host 105 is arranged to access or request data of sensor device 100 and data of auxiliary device 110 indifferent given periods of time respectively through the shared I2C bus. Specifically, the sensor device 100 is arranged to monitor or snoop the communication on the shared I2C bus to count the cycles of clock signal CLK1 in a given period of time which is determined based on the periodically transmission communication through the shared I2C bus.

Figure 2:
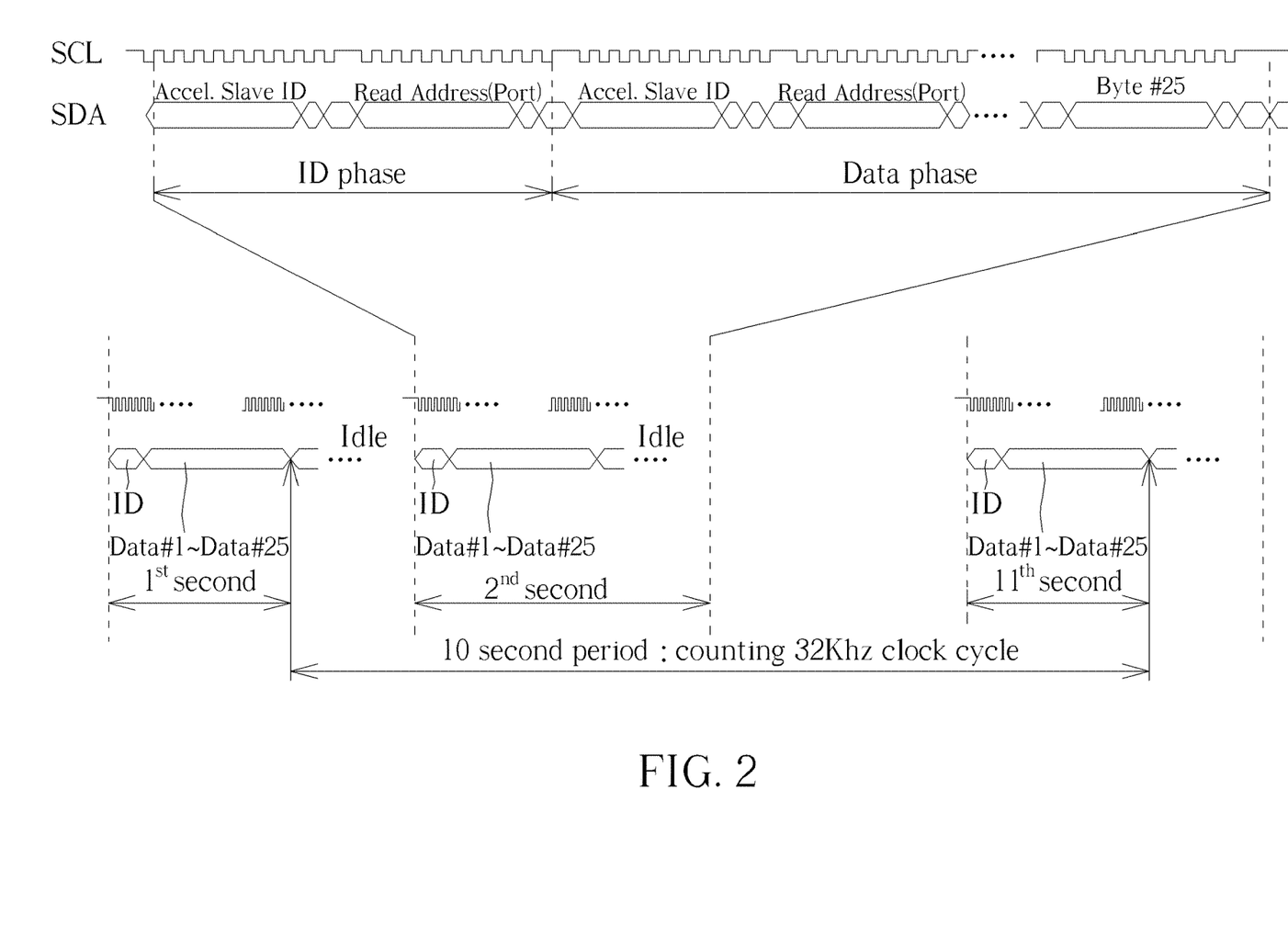
FIG. 2 is a timing diagram illustrating an example of host issuing a data request signal to access data of auxiliary device through the I2C bus.

FIG. 2 is a timing diagram illustrating an example of host 105 issuing a data request signal to access data of auxiliary device 110 through the I2C bus. As shown in FIG. 2, in this example, the host 105 may periodically access the auxiliary device 110 such as an accelerometer/accelerator sensor device to read/retrieve data of auxiliary device 110 through the shared I2C bus. The host 105 is arranged to read/retrieve data of auxiliary device 110 in a given period of time such as a fixed and accurate cycles which may be determined by the RTC circuit 105 and is not easily affected or changed due to environmental factors such as temperature, voltage, or pressure. In replying to the data request of host 105, the accelerometer/accelerator sensor device 110 is arranged to periodically transmit information of ID and data/packets through the shared I2C bus to the host 105. Accordingly, the sensor device 100 can be arranged to snoop or monitor the status of shared I2C bus to adjust the clock signal CLK1 of oscillator circuit 115A based on the periodically transmitted information of ID and data/packets in a given period of time.

In the example of FIG. 2, the host 105 is arranged to periodically access or retrieve data of auxiliary device 110 through I2C bus each second (but not limited). The auxiliary device 110 is arranged to transmit identification (ID) information including slave ID and read address and data information including N data bytes of auxiliary device 110 to the host 105 through I2C bus, as shown by SDA on FIG. 2, and then arranged to be idle until the next second. N for example is equal to 25; that is, the auxiliary device 110 is arranged to transmit 25 data bytes to the host 105 through SDA each time. Thus, if detecting consecutive two sets of ID and data information, the processing circuit 120 of sensor device 100 can decide that one second is gone. Similarly, if detecting consecutive eleven sets of ID and data information, the processing circuit 120 of sensor device 100 can decide that ten seconds are gone.

The processing circuit 120 is arranged to control the oscillator circuit 115A at a predetermined time interval so as to adjust or calibrate the clock signal CLK1. For example, the predetermined time interval may be ten seconds (but not limited). That is, the sensor device 100 adjusts its clock signal CLK1 each ten seconds. The processing circuit 120 is arranged to determine whether the predetermined time interval (i.e. ten seconds) is gone by deciding whether consecutive eleven sets of ID and data information of auxiliary device 110 have been snooped or monitored. The processing circuit 120 is arranged to immediately start to count the clock cycles of clock signal CLK1 after has detected a first set of ID and data information of auxiliary device 110, and is arranged to immediately finishing the counting after has detected an eleventh set of ID and data information of auxiliary device 110.

Ideally, if the clock frequency of signal CLK1 is accurate and equal to 32 KHz, the number of finally counted clock cycles should be 320K cycles. The processing circuit 120 is arranged to compare the actually counted cycle number with the ideal cycle number (i.e. 320K) to determine whether the clock frequency becomes slower or faster. If detecting that the actually counted cycle number is equal to 315K which is smaller than 320K, the processing circuit 120 determines that the clock frequency has become slower and then is arranged to control the oscillator 115A to adjust or tune the clock frequency of clock signal CLK1. If detecting that the actually counted cycle number is equal to 330K which is greater than 320K, the processing circuit 120 determines that the clock frequency has become faster and then is arranged to control the oscillator 115A to adjust or tune the clock frequency of clock signal CLK1. Thus, by repeating the comparison and frequency adjustment, the clock frequency can be calibrated to be accurate. It should be noted that in this example the processing circuit 120 is arranged to control or adjust the hardware parameters of oscillator circuit 115A so as to adjust the clock signal CLK1; however, this is not intended to be a limitation.

In the above embodiment, the processing circuit 120 is arranged to monitor or snoop the transmission of ID and data information reported from auxiliary device 110 so as to adjust the clock signal CLK1. In other embodiments, the processing circuit 120 can be arranged to snoop or monitor the data request signal periodically issued by the host 105 so as to adjust the clock signal CLK1, and such data request signal can be a signal for requesting data of auxiliary device 110 or a signal for requesting data of sensor device 100. That is, the sensor device 100 can be arranged to monitor a signal which is periodically sent from the host 105 to sensor device 100 so as to calibrate its clock signal CLK1. The above operations are similar to the operation of monitoring or snooping the ID and data information reported from auxiliary device 110, and are not detailed for brevity.

Figure 3:
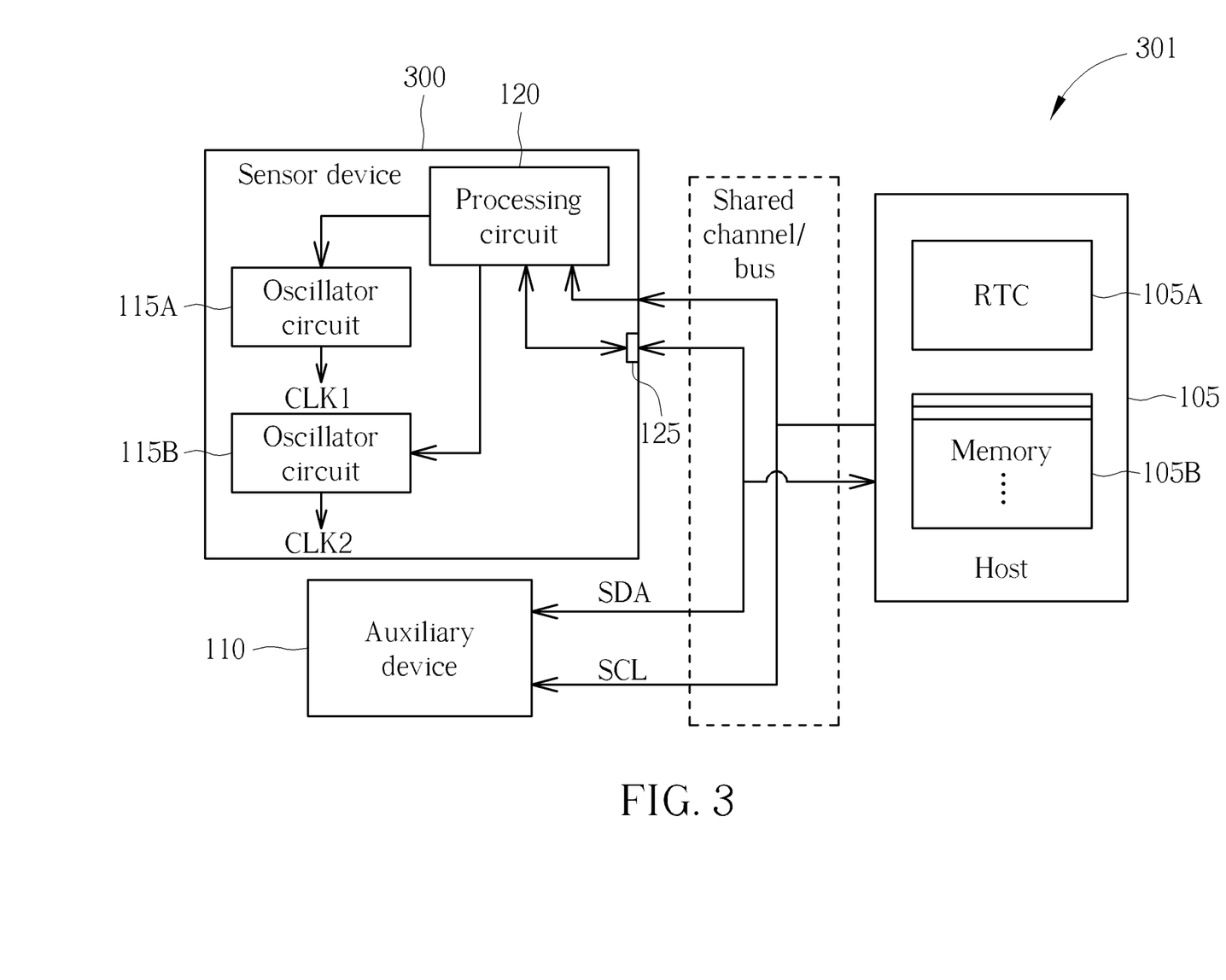
FIG. 3 is a diagram of a multi-sensor system/apparatus according to a second embodiment of the invention.

Additionally, the operation for monitoring or snooping the ID and data information reported from auxiliary device 110 can be applied to calibration/adjustment of a plurality of oscillator circuits within a sensor device. FIG. 3 is a diagram of a multi-sensor system/apparatus 301 according to a second embodiment of the invention. The multi-sensor system/apparatus 301 comprises a processor or host 105, at least a first sensor device 300 and an auxiliary device 105 such as a second sensor device, a shared channel between host 105, the first sensor device 300, and auxiliary device 105. The sensor device 300 for example is a PPG sensor device (but not limited) and is capable of adjusting a plurality of clock signals of sensor device 300 according to the communication between host 105 and auxiliary device 110 and/or a communication between host 105 and sensor device 300 through a specific bus such as I2C (inter-integrated circuit) bus or SPI (Serial Peripheral Interface) bus; this is not intended to be a limitation. In this example, the sensor device 300, auxiliary device 110, and host 105 are connected to the I2C bus, and the auxiliary device 110 for example is an accelerometer/accelerator sensor device. The PPG sensor device 300 can be arranged to adjust or calibrate its clock signals (e.g. clock frequencies of two oscillator circuits 115A and 115B) based on the communication between host 105 and accelerometer/accelerator sensor device 110 such as a data request signal periodically sent from host 105 to accelerometer/accelerator sensor device 110 to request data of accelerometer/accelerator sensor device 110.

In practice, the sensor device 300 comprises a first oscillator circuit 115A, a second oscillator circuit 115B, and a processing circuit 120. The first oscillator circuit 115A is configured for generating a first clock signal CLK1. The second oscillator circuit 115B is configured for generating a second clock signal CLK2 having a second clock frequency different from the first clock frequency of first clock signal CLK1. The clock signal CLK1 for example has the clock frequency equal to 32 KHz (but not limited), and the clock signal CLK2 for example has the clock frequency equal to 16 MHz (but not limited). The processing circuit 120 is configured for controlling the oscillator circuits 115A and 115B respectively so as to calibrate the clock frequencies of the first and second clock signals CLK1 and CLK2 according to the communication between the host 105 and the auxiliary device 110 or the communication between the host 105 and sensor device 300.

For example, in a normal mode of sensor device 300, the oscillator circuit 115B with the clock frequency of 16 MHz is enabled or activated to periodically sample the sensed PPG signal of sensor device 300 to generate PPG data. In a sleep mode or power saving mode, the oscillator circuit with higher clock frequency, i.e. the oscillator circuit 115B, is disabled to save power, and the oscillator circuit with lower clock frequency, i.e. the oscillator circuit 115A with the clock frequency of 32 KHz in this situation, is used as a timer so that the sensor device 300 can periodically determine whether to exit sleep mode or power saving mode. Since the different oscillator circuits with different clock frequencies may have different variations or frequency offsets even due to the same temperature change, the sensor device 300 is arranged to calibrate or adjust the clock signals CLK1 and CLK2 respectively based on the communication between the host 105 and the auxiliary device 110 or the communication between the host 105 and sensor device 300. Thus, the sensor device 300 can obtain accurate clock signals with different frequencies of 16 MHz and 32 KHz. For example, the first clock signal CLK1 may become slower and the second clock signal CLK2 may become faster due to the same environmental factors, and the sensor device 300 based on the communication between the host 105 and the auxiliary device 110 or the communication between the host 105 and sensor device 300 can be arranged to calibrate or adjust the clock signals CLK1 and CLK2 to be accurate clock signals.

In addition, in other embodiments, the sensor device 300 may be arranged to calibrate or adjust the clock signal CLK1 having the lower clock frequency by snooping or monitoring the communication between the host 105 and the auxiliary device 110 or the communication between the host 105 and sensor device 300. Then, the sensor device 300 calibrates or adjusts the clock signal CLK2 having the higher clock frequency based on the adjusted or calibrated clock signal CLK1.

Compared to conventional schemes using an RTC circuit (within or outside a host) to adjust or calibrate the clock signal(s) in a sensor device, it is not required for the sensor device 100/300 in the embodiments to refer to the clock cycles of RTC circuit 105A in the host 105 or another external RTC circuit, and thus it is not necessary to implement an additional signal port/pin externally connected to the signal of RTC circuit 105A in the host 105 or another external RTC circuit. The chip area of sensor device 100/300 can be reduced.

Further, the systems of FIG. 1 and FIG. 3 are multi-sensor systems comprising at least two sensor devices such as sensor device 100/300 and auxiliary device 110, the sensor device 100/300 can synchronize with the auxiliary device 110 by snooping or monitoring the communication between host 105 and auxiliary device 110 and/or information/traffic/data periodically transmitted to the host 105 from auxiliary device 110. This can significantly save clock signal calibration testing time. Also, it is not required for the sensor device 100/300 to further implement a memory circuit for clock signal calibration. In addition, the sensor device 100/300 can be arranged to automatically synchronize with the auxiliary device 110, and it becomes more easily for the software algorithms running on the host 105 to process the data from sensor device 100/300 and data from auxiliary device 110 since the software algorithms do not need to synchronize both data or merely needs less time to synchronize both data.

Further, in a multi-sensor system of embodiments of the invention, by snooping or monitoring the communication between a host and an auxiliary device and/or information/traffic/data periodically transmitted to the host from the auxiliary device, a sensor device such as PPG sensor can be arranged to integrate its data/packets with corresponding data/packets of auxiliary device and then to output/provide integrated data/packets to the host. Thus, it is easy for the user to design the software algorithms running on the host since data of multiple sensors have been synchronized or aligned.

Refer to FIG. 1 again. The sensor device 100 further comprises a receiving port 125 which is configured to receive a plurality of packets in a given period of time. For example, the receiving port 125 is arranged to receive auxiliary packets transmitted by auxiliary device 110 through the shared channel, i.e. packets from auxiliary device 110, in such given period of time, wherein each auxiliary packet includes data from the auxiliary device 110. Similarly, the sensor device 300 further comprises the receiving port 125. The processing circuit 120 is arranged to snoop, monitor, and collect/access the communication, information, traffic, data, and/or packets periodically transmitted from auxiliary device 110 to host 105 through the shared channel in the given period of time. The processing circuit 120 in this situation is used as a data generating module configured to generate at least one sensing packet based on the number of auxiliary packets received in the given period of time. The data generating module (i.e. processing circuit 120) is arranged to adjust the first clock signal CLK1 according to the number of the plurality of auxiliary packets received in the given period of time, and then is arranged to generate the at least one sensing packet by referring to the adjusted first clock signal CLK1. Also, this method can be applied to calibration of second clock signal CLK2, and the description is not detailed for brevity. The processing circuit 120 then is arranged to align collected auxiliary packets of auxiliary device 110 such as an accelerometer/accelerator sensor device with the at least one sensing packet so as to integrate the data/packets to generate integrated data/packets. The processing circuit 120 then outputs/provides the integrated data/packets having data/packets of multiple sensor devices to the host 105. That is, the sensor device 100 used as PPG sensor device can generate and provide integrated data/packet having both data of PPG sensor device and data of accelerometer/accelerator sensor device for the host 105 or another external circuit to calculate a user's heart rate and/or other biomedical features. It is more convenient for the host 105 such as a microcontroller or sensor hub, another external circuit, or software algorithm(s) to derive biomedical features since data of PPG sensor device and data of accelerometer/accelerator sensor device have been synchronized or aligned. The sensor device 100 can be arranged to report both data of PPG sensor device and data of accelerometer/accelerator sensor device to the host 105 each time when collecting N data bytes of accelerometer/accelerator sensor device; N for example can be designed as 20 or 25.

In addition, the number of data units such as data bytes generated by a PPG sensor device can be different from the number of data units such as data bytes generated by the accelerometer/accelerator sensor device. For instance, the PPG sensor device may generate ten data units per second, and the accelerometer/accelerator sensor device may generate twenty or twenty-five data units per second. The sensor device 100 can be arranged to accumulate data units and/or generate interpolated data units so as to generate/provide enough data units thereby integrating both data of PPG sensor device and data of accelerometer/accelerator sensor device before reporting the data to the host 105. For instance, the sensor device 100 may be arranged to accumulate data units and/or generate interpolated data units so as to generate/provide N data units (or bytes) if collecting N data units (or bytes) of accelerometer/accelerator sensor device. The data accumulation and/or data interpolation can be regarded as a synchronization operation for the sensor device 100 and accelerometer/accelerator sensor device.

Further, it should be noted that in the above example the clock signal CLK1 may be used as a clock reference signal for generating the sensing packets of PPG sensor device 100, and the processing circuit 120 is arranged to the clock frequency of such clock reference signal for generating the sensing packets. In addition, the concept can be applied to the embodiments of FIG. 3; either of the clock signals CLK1 and CLK2 may be used as a clock reference signal for generating the sensing packets of PPG sensor device 300 under different modes, and the processing circuit 120 is arranged to the clock frequency of such clock reference signal for generating the sensing packets.

Figure 4:
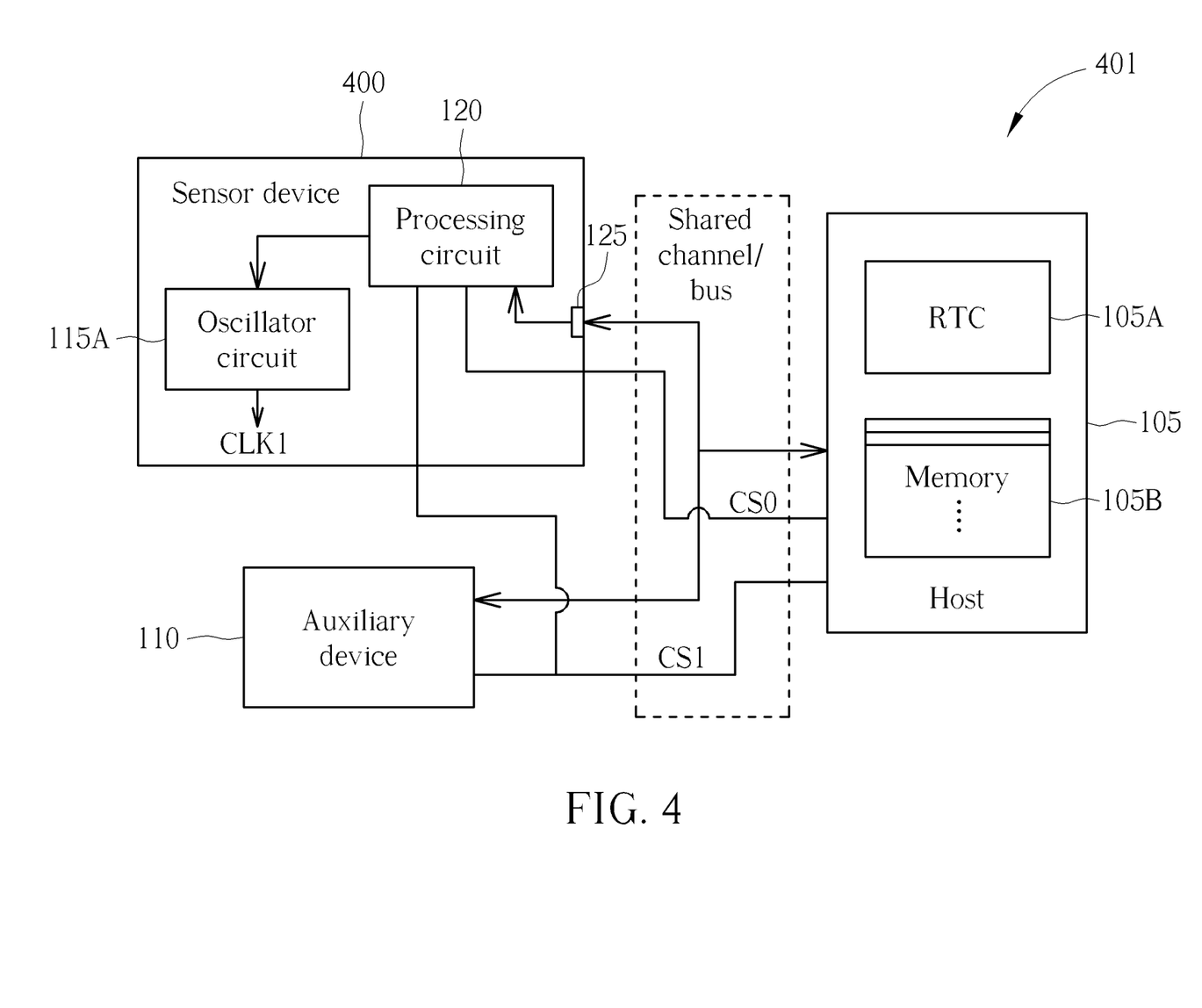
FIG. 4 is a diagram of a multi-sensor system/apparatus according to a third embodiment of the invention.

Refer to FIG. 4. FIG. 4 is a diagram of a multi-sensor system/apparatus 401 according to a third embodiment of the invention. The multi-sensor system/apparatus 401 comprises a processor or host 105, at least a first sensor device 100 and an auxiliary device 105 such as a second sensor device, a shared channel connected between host 105, sensor device 100, and auxiliary device 105. In this embodiment, the shared channel is implemented using SPI bus. The signaling CS0 comprised by the SPI bus indicates a chip select port corresponding to the sensor device 400, and the assertion of signaling CS0 can be regarded as a data request signal sent from the host 105 to sensor device 400 for requesting sensing data/packets. The signaling CS1 comprised by the SPI bus indicates a chip select port corresponding to the auxiliary device 110, and the assertion of signaling CS1 can be regarded as a data request signal sent from the host 105 to auxiliary device 110 for requesting auxiliary data/packets. When the host 105 is arranged to communicate with the auxiliary device 110 to retrieve data, the chip select signal CS1 is asserted. Instead, when the host 105 is arranged to communicate with the sensor device 400 to retrieve data, the chip select signal CS1 is asserted. The chip select signals CS0 and CS1 are de-asserted if the host 105 is not arranged to communicate with sensor device 400 and auxiliary device 110. The processing circuit 120 of sensor device 400 is arranged to snoop or monitor the chip select signal CS1 to detect whether the chip select signal CS1 is asserted so as to decide whether the host 105 is communicating with the auxiliary device 110. In practice, the sensor device 400 is implemented with an additional signal port to connect and receive the chip select signal CS1. Thus, when detecting the assertion of chip select signal CS1, the processing circuit 120 can decide that the host 105 retrieves data/packets of the auxiliary device 110. Thus, data/packets currently transmitted through the shared SPI bus are generated and outputted by the auxiliary device 110. The processing circuit 120 is arranged to use the receiving port 125 to collect data/packets currently transmitted through the shared SPI bus and align the currently transmitted auxiliary data/packets with PPG data/packets which are currently generated by the sensor device 400. Thus, the processing circuit 120 can integrate PPG data/packets sensed during a given time period and accelerator data/packets sensed during the same given time period, to generate and output integrated data/packets. That is, the processing circuit 120 performs the data alignment and synchronization for two different types of sensors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sensor device capable of adjusting at least one clock signal of the sensor device according to a first communication between a host and an auxiliary device through a specific bus, comprising:
   a first oscillator circuit, configured for generating a first clock signal; and
   a processing circuit, configured for calibrating a clock frequency of the first clock signal according to the first communication between the host and the auxiliary device, the sensor device being arranged to perform a second communication with the host through the specific bus, the second communication being different from the first communication, and the auxiliary device being externally connected to the sensor device through the specific bus; the sensor device is a photoplethysmogram sensor device, and the auxiliary device is an accelerator sensor device.

2. The sensor device of claim 1, further comprising:
   a second oscillator circuit, configured for generating a second clock signal having a clock frequency different from the clock frequency of the first clock signal;
   wherein the processing circuit is arranged to calibrate the clock frequency of the second clock signal according to the first communication between the host and the auxiliary device.

3. The sensor device of claim 1, wherein the first communication comprises a data request signal periodically sent from the host through the specific bus to request data of the auxiliary device or data packets periodically transmitted from the auxiliary device to the host through the specific bus.

4. The sensor device of claim 1, further comprising:
   a receiving port, configured for receiving data of the auxiliary device in a given period of time through the specific bus;
   wherein the processing circuit is arranged for aligning data generated by the sensor device in the given period of time with the data of the auxiliary device in the given period of time.

5. A method applied to a sensor device and capable of adjusting at least one clock signal of the sensor device according to a first communication between a host and an auxiliary device through a specific bus, comprising:
   using a first oscillator circuit to generate a first clock signal;
   calibrating a clock frequency of the first clock signal according to the first communication between the host and the auxiliary device;
   using the sensor device to perform a second communication with the host through the specific bus, the second communication being different from the first communication, and the auxiliary device being externally connected to the sensor device through the specific bus; the sensor device is a photoplethysmogram sensor device, and the auxiliary device is an accelerator sensor device.

6. The method of claim 5, further comprising:
   using a second oscillator circuit to generate a second clock signal having a clock frequency different from the clock frequency of the first clock signal; and
   calibrating the clock frequency of the second clock signal according to the first communication between the host and the auxiliary device.

7. The method of claim 5, wherein the first communication comprises a data request signal periodically sent from the host through the specific bus to request data of the auxiliary device or data packets periodically transmitted from the auxiliary device to the host through the specific bus.

8. The method of claim 5, further comprising:
using a receiving port of the sensor device to receive data of the auxiliary device in a given period of time through the specific bus; and
aligning data generated by the sensor device in the given period of time with the data of the auxiliary device in the given period of time.

9. A sensor device capable of adjusting at least one clock signal of the sensor device according to a first communication between a host and an auxiliary device through a specific bus, comprising:
a first oscillator circuit, configured for generating a first clock signal;
a processing circuit, configured for calibrating a clock frequency of the first clock signal according to the first communication between the host and the auxiliary device, the sensor device being arranged to perform a second communication with the host through the specific bus, the second communication being different from the first communication, and the auxiliary device being externally connected to the sensor device through the specific bus; and
a receiving port, configured for receiving data of the auxiliary device in a given period of time through the specific bus;
wherein the processing circuit is arranged for aligning data generated by the sensor device in the given period of time with the data of the auxiliary device in the given period of time.

10. The sensor device of claim 9, wherein the sensor device is a photoplethysmogram sensor device, and the auxiliary device is an accelerator sensor device.

11. The sensor device of claim 1, further comprising:
a second oscillator circuit, configured for generating a second clock signal having a clock frequency different from the clock frequency of the first clock signal;
wherein the processing circuit is arranged to calibrate the clock frequency of the second clock signal according to the first communication between the host and the auxiliary device.

12. The sensor device of claim 9, wherein the first communication comprises a data request signal periodically sent from the host through the specific bus to request data of the auxiliary device or data packets periodically transmitted from the auxiliary device to the host through the specific bus.

13. A method applied to a sensor device and capable of adjusting at least one clock signal of the sensor device according to a first communication between a host and an auxiliary device through a specific bus, comprising:
using a first oscillator circuit to generate a first clock signal;
calibrating a clock frequency of the first clock signal according to the first communication between the host and the auxiliary device;
using the sensor device to perform a second communication with the host through the specific bus, the second communication being different from the first communication, and the auxiliary device being externally connected to the sensor device through the specific bus;
using a receiving port of the sensor device to receive data of the auxiliary device in a given period of time through the specific bus; and
aligning data generated by the sensor device in the given period of time with the data of the auxiliary device in the given period of time.

14. The method of claim 13, wherein the sensor device is a photoplethysmogram sensor device, and the auxiliary device is an accelerator sensor device.

15. The method of claim 5, further comprising:
using a second oscillator circuit to generate a second clock signal having a clock frequency different from the clock frequency of the first clock signal; and
calibrating the clock frequency of the second clock signal according to the first communication between the host and the auxiliary device.

16. The method of claim 13, wherein the first communication comprises a data request signal periodically sent from the host through the specific bus to request data of the auxiliary device or data packets periodically transmitted from the auxiliary device to the host through the specific bus.

* * * * *